June 6, 1967 R. D. HANSEN 3,323,474
ROTARY FURNACE FOR INCINERATING HOUSE REFUSE, INDUSTRIAL
REFUSE, AND OTHER WASTE MATERIALS
Filed Nov. 12, 1964 4 Sheets-Sheet 1

INVENTOR.
RUNE DYRLUND HANSEN
BY
Albert M. Parker

INVENTOR.
RUNE DYRLUND HANSEN
BY
Albert M. Parker

June 6, 1967            R. D. HANSEN            3,323,474
ROTARY FURNACE FOR INCINERATING HOUSE REFUSE, INDUSTRIAL
REFUSE, AND OTHER WASTE MATERIALS Filed Nov. 12, 1964            4 Sheets-Sheet 4

INVENTOR.
RUNE DYRLUND HANSEN
BY Albert M. Parker

United States Patent Office 3,323,474
Patented June 6, 1967

3,323,474
ROTARY FURNACE FOR INCINERATING HOUSE REFUSE, INDUSTRIAL REFUSE, AND OTHER WASTE MATERIALS
Rune Dyrlund Hansen, Virum, Denmark, assignor to Dano Ingeniorforretning og Maskinfabrik Ingenior Kaj Petersen's Fond, Buddinge pr, Soborg, Denmark, a corporation of Denmark
Filed Nov. 12, 1964, Ser. No. 410,697
Claims priority, application Denmark, Nov. 13, 1963, 5,336/63
21 Claims. (Cl. 110—14)

This invention relates to rotary furnaces for the incineration of waste materials such as house refuse, industrial refuse, and other waste materials wherein the materials to be burned are passed through the rotary furnace with the combustible constitutents being burned during their passage through the furnace. Known furnaces are designed as horizontal cylinders with the materials supply at one end of the cylinder and the materials discharge at the opposite end thereof, and in all essentials the interior of the cylinder constitutes a single, through-going, uninterrupted chamber.

As will be known the waste materials should preferably be passed through the furnace as a relatively thin layer so as to establish optimal conditions for the combustion air to obtain contact with the combustible constituents of the mass of material. Consequently, between the surface of the mass of material and the part of the furnace located above said surface there will be a large empty space filled with combustion air. On account of the size of the empty space the said air will pass through the combustion chamber relatively slowly and at slight turbulence, and much air will flow through the furnace without contributing to the combustion or only slightly so. As this air, which can be characterized as excess air, will leave the furnace with the same temperature as that of the smoke, the result will be a loss of heat, which for the incineration of the materials which are to be burnt in the furnace will often have to be compensated for by an additional supply of heat, e.g. by means of an oil burner, at any rate when the material has a low calorific value.

It is the object of the present invention to provide a rotary furnace, in which the said drawbacks are remedied.

According to the invention there is provided a rotary furnace for incinerating house refuse, industrial refuse, and/or other waste materials, such furnace comprising a furnace shell rotatable about a horizontal axis, at least one longitudinal partition dividing the interior of the furnace into at least two chambers, said chambers communicating with each other at one end of the furnace, a materials inlet communicating with one of the chambers and the materials, a materials outlet communicating with the other chamber. The following detailed explanations of the invention are based on an embodiment having one longitudinal partition and two chambers.

By the provision of the said partition an improved utilization of the hollow space of the furnace for the incineration of the material is obtained. A treatment area almost twice as large as that of the known type of rotary furnaces and with like requirements as to space is provided, since it is now possible to treat the materials in two juxtaposed chambers, both extending in the longitudinal direction of the furnace. The treatment can then be arranged in the manner that a combustion is effected in both chambers, or that one chamber which is in connection with the materials inlet serves mainly as a pre-drying chamber, while the combustion takes place chiefly in the other chamber and in the passage connecting the two chambers.

On account of the said subdivision of the interior of the furnace each chamber will have a sectional area which for practical purposes is only half the sectional area of the combustion chamber of the said known furnaces. This means that the sectional area of flow for combustion air above the material will have been considerably reduced, while large surfaces are still preserved over which the material can spread during the rotation of the furnace and thus present a large combustion surface. The reduction in the area of flow affords the possibility of obtaining increased velocity and turbulence of the air, which will result in improved conditions for a thorough combustion, and simultaneously in a substantial reduction in the quantity of excess air. As the combustion capacity will be substantially the same per meter of length of the combustion chamber, whether the furnace is of the known cylindrical type or of the double-chamber type proposed according to the invention, always provided that the external diameter of the furnace is the same, a furance which is substantially shorter than a furnace of the said known type will be sufficient to obtain the same throughput when the constructional principle indicated by the invention is applied.

The construction according to the invention has the additional advantage that extra heat can be supplied and waste gases removed at the place where one chamber is in connection with the other, depending on the character of the material to be incinerated, thus making it possible to obtain an especially effective combustion.

The invention also comprises a number of suitable embodiments of the furnace indicated by the invention.

For the purpose of obtaining a thorough agitation and spreading of the material in the chambers, the surfaces of the longitudinal partition facing the furnace shell may suitably be concave. Such a design also serves to provide a good bracing of the partition. A suitable detail design of the interior of the furnace can be obtained by allowing the longitudinal partition to extend diametrically or substantially so from one end of the furnace into proximity to the other end so that a reversing chamber connecting the two chambers is formed at the latter end of the furnace. As regards rotary motion, the longitudinal partition will lie in a neutral zone and revolve about its central longitudinal axis, and in all essentials the two chambers will be of equal size. For the purpose of obtaining a long passage of material and consequently a good utilization of the cavity of the furnace for treatment of the material it is also expedient that the openings for the charging and discharging of material be provided in or at the same end of the furnace, opposite the one where the chambers communicate.

The material is suitably supplied to the furnace at one end thereof, and an advantageous charging of the material into the first chamber of the furnace, foremost in the travelling direction, can be obtained by forming a feed chamber in the furnace at the said end thereof by means of a traverse partition shaped as a segment of a circle, said partition projecting from the furnace shell to the center of the furnace, and the longitudinal partition extending therefrom. In this feed chamber the incoming material is collected, and the said first chamber in the furnace is charged from the feed chamber with another supply of material every time the chamber during the rotation of the furnace is in the lowermost position, since the material will then be allowed to move forward from the feed chamber beneath the transverse partition and into the said first chamber.

The materials outlet from the one of the two chambers which is rearmost in the travelling direction is suitably provided at the side of the transverse partition which faces away from the feed chamber, where at least one discharge opening can be provided in the furnace shell, in which case the transverse partition will form a wall ending the total travelling distance for material through the furnace.

The materials outlet may consist of two or more discharge openings spaced from each other in the furnace shell at the arc of an angle, and this arrangement is intended to ensure that during the rotation of the furnace at least one opening is always unobstructed by slag, and that combustion air can be drawn down into the furnace through the said opening.

Furthermore, as suggested in the foregoing, it may be expedient to connect the reversing chamber with a burner, e.g. an oil burner, as the materials can be ignited or additional heat supplied, if necessary, by means of this burner. In the reversing chamber the burner flame will meet a mass of material which has been well loosened, so that ignition is facilitated.

Particularly during the starting up of the furnace when much heat is consumed for the heating of the furnace walls, it may be desirable to be able to supply additional heat to the furnace, especially in the second chamber. For this purpose a device for introducing liquid fuel into the said chamber may be provided opposite the materials outlet. As a fine distribution of the fuel is not necessary, it is possible to use e.g. waste oil with advantage. A particularly suitable form of such an arrangement is obtained by the use of a furnace in which the materials outlet consists of at least one discharge opening provided in the furnace shell, in which case the device may consist of a pipe delivering fuel above the furnace shell in the path of rotation of the discharge opening, said pipe being connected with a source of fuel supply, which is controlled relative to the rotary motion of the furnace so that fuel is supplied only when the discharge opening lies beneath the mouth of the delivery pipe. The fuel can then spread in the chamber and on the material already present therein. It will be understood that in the placing of the delivery pipe and the designing of a door closing the discharge opening due regard must be had to the intended supply of fuel. If, for example, the door is a grate, the fuel delivery pipe should be located opposite the interstice between two bars which should extend in the direction of rotation of the furnace. If the discharge door is a perforated plate, it should be provided with a suitable slot extending in the direction of rotation. The supply of liquid fuel can then be effected by means of a pump or under pressure direct from a storage tank with the use of a control valve.

Furthermore, the reversing chamber can be connected to the smoke flue of the furnace, by which means it will be possible to remove smoke from the first as well as from the second furnace chamber when a combustion takes place in both said chambers. When material with a high calorific value is incinerated a resulting wall temperature can be obtained, which is so high that the smoke is odourless without further heat treatment. For pre-drying purposes also the feed chamber can be in connection with the smoke flue of the furnace so that waste gas can be passed through the chamber.

With a view to furthering the passage of the mass of material through the rotary furnace the longitudinal partition may extend somewhat obliquely in relation to the axis of the furnace in such a manner that the distance between the partition and the furnace shell in the chamber which is in connection with the materials inlet increases towards the connection between the two chambers. During the rotation of the furnace the longitudinal partition will constitute the bottom of the first and of the second chamber alternately, and on account of the inclination of the partition the material will move in the first chamber towards the reversing chamber, and in the second chamber away from the reversing chamber. The furnace shell, however, may be horizontally mounted.

For the purpose of obtaining a well-braced structure, the longitudinal partition may consist of two partition members of metal whose surfaces face one another, said members extending between opposite sides of the furnace shell at a distance from one another. Such partition members will have been provided with a refractory lining, as will the furnace wall. As the partition members must be located at a distance from one another, a space is formed between the members, through which the metal partitions can be cooled. For this purpose apertures may be provided in the parts of the furnace shell opposite the said space, and at the longitudinal section or sections provided with such apertures the furnace shell may be partially surrounded by a suction hood which may then draw cooling air through the said space. The air outlet of the suction hood can be arranged to communicate with the combustion air inlet to the furnace so that preheated combustion air is supplied.

The longitudinal partition, however, can also be constructed as two self-supporting masonry arches supporting one another at the middle. In order to save brick, hollow filling members may be inserted in the spaces defined by the arches and the furnace shell. In order to obtain the inclination of the longitudinal partition indicated in the foregoing, the partition may be composed in the latter case of successive arch sections stepped in the longitudinal direction of the furnace. The thrust of the arches of the individual sections will hereby be directed against the shell at many different angles. In order to avoid difficult adjustment work and the necessity of using many differently moulded bricks, a pair of moulded bricks can advantageously be used. This pair of moulded bricks may consist of a support brick with an outwardly open bearing groove, the transverse section of which is an arc of a circle, and of a counter brick which is designed with a correspondingly cylindrical end for rotatable mounting in the groove. The support brick is designed to be set in the masonry of the furnace shell, whereas the counter brick constitutes the first brick of the arch, and on account of the rotatable mounting in the support brick of the counter brick, the pair of moulded bricks can be used for arches having different degrees of arching.

The invention is hereinafter described in more detail, merely by way of example, with reference to the accompanying drawings, wherein.

Figure 1:
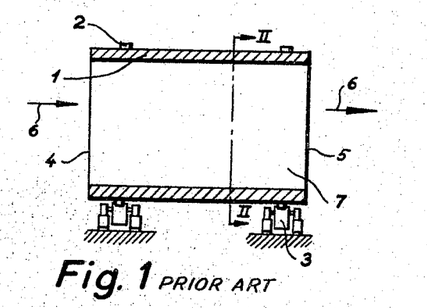
FIGURE 1 shows schematically a longitudinal section through a rotary furnace of a known type.
Figure 2:
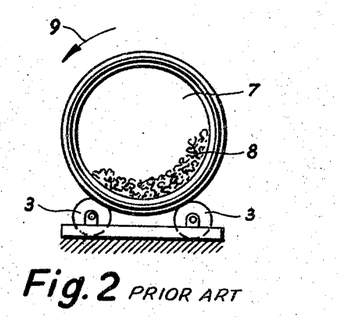
FIGURE 2 is a cross sectional view taken along line II—II in FIGURE 1.

The known rotary furnace shown in FIGURES 1 and 2 consists of a horizontally extending cylindrical furnace shell 1 which is rotatably mounted about its horizontal axis by means of riding rings 2 and driving rollers 3. The material to be burned is introduced at one end 4 of the furnace and discharged at the other end 5 so that the material passes through the furnace in the direction of arrows 6. The interior of the furnace constitutes a single throughgoing combustion chamber 7.

FIGURE 2 shows a layer of material 8 which has been introduced into the furnace, and it will be seen that the layer occupies only a relatively small part of the cavity of the combustion chamber. The direction of the rotary motion of the furnace is indicated by means of an arrow 9.

Figure 3:
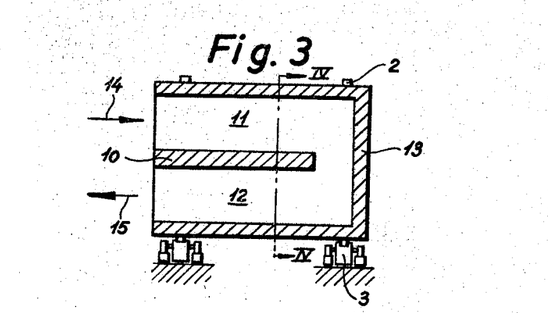
FIGURE 3 shows schematically a lingitudinal section through a rotary furnace according to the invention.
Figure 4:
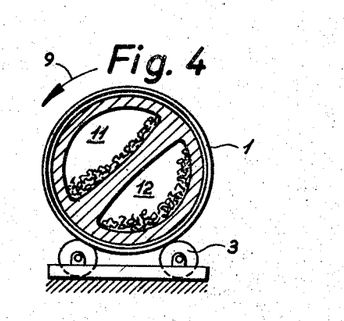
FIGURE 4 is a cross section on the line IV—IV in FIGURE 3.

As shown in FIGURES 3 and 4 the furnace design proposed according to the invention differs in principle from the known design as illustrated in FIGURES 1 and 2 in that the interior of the furnace is divided by means of a longitudinal partition 10 into two chambers 11 and 12 which communicate at one end 13 of the furnace, and of which one chamber, viz. chamber 11, is in connection with the materials inlet, as indicated by means of an arrow 14, and the other chamber viz. chamber 12, is in connection with a materials outlet, as indicated by means of an arrow 15.

FIGURE 4 which shows the same furnace as rotated from the position shown in FIGURE 3 through 45° in the direction of rotation 9, illustrates the layers of material in the chambers. During the rotation of the furnace both layers of material will be overturned along surfaces having an extent which is sufficient to ensure that the layers of material present a sufficiently large combustion surface. As appears from FIGURE 4, the surfaces of the longitudinal partition 10, which face the furnace shell 1, are concave.

The object of the arrangement shown herein is that the material introduced at 14 should pass during the treatment through the chamber 11 from one end thereof, and at the opposite end thereof enter the chamber 12 and pass therethrough and subsequently be discharged at 15. Depending upon composition and nature of the material introduced, a combustion will take place in both chambers 11 and 12, or else the chamber 11 may serve to varying degrees as a pre-drying chamber.

In the drawing the furnaces in FIGURES 1 and 3 are shown to have the same length and the same diameter, but as the furnace shown in FIGURE 3 comprises two chambers for the treatment of material, the capacity thereof will be substantially increased, and in practice almost twice as large as that of the furnace shown in FIGURE 1.

Figure 5:
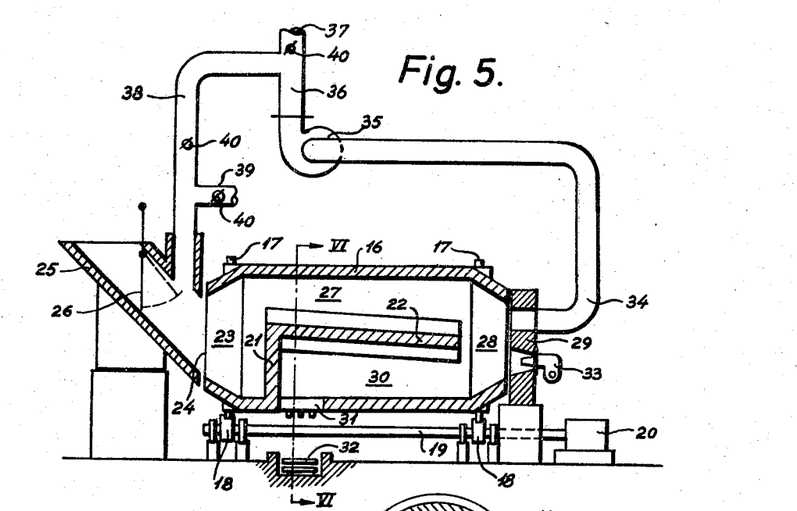
FIGURE 5 shows schematically partly in side elevation and partly in section one embodiment of a mounted rotary furnace according to the invention.

In the embodiment shown in FIGURE 5 of a mounted rotary furnace according to the invention, the furnace consists of a furnace shell 16 which by means of riding rings 17 is rotatably mounted on driving wheels 18 for rotation about its longitudinal axis. The driving wheels 18 are connected to a motor 20 by means of a shaft 19.

At a distance from the left-hand end of the furnace there is provided a transverse partition 21 shaped as a segment of a circle, said partition projecting from the furnace shell 16 to the centre of the furnace. From the transverse partition a longitudinal partition 22 extends substantially diametrically into proximity to the right-hand end of the furnace.

Figures 6, 7:
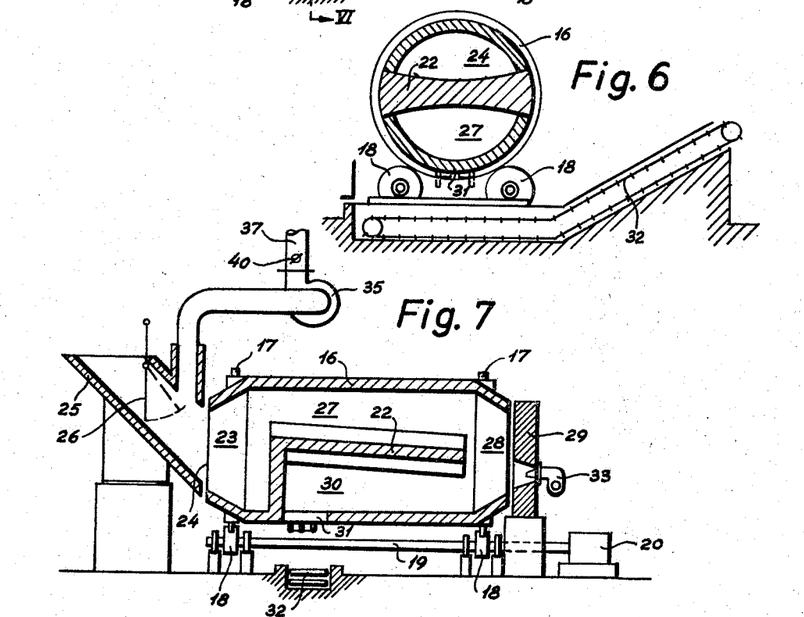
FIGURE 6 is a cross section on line VI—VI in FIGURE 5.
FIGURE 7 is a view similar to FIGURE 5 of a second embodiment of a rotary furnace according to the invention.

In this manner the furnace is divided into four chambers, viz. a feed chamber 23 to the left of the transverse partition 21, communicating over an inlet opening 24 with a hopper 25 for the supply material, said hopper being adjustable by means of a flap 26, a first treatment chamber 27 defined by one surface of the longitudinal partition 22 and the part of the furnace shell 16 opposing the said surface and which in the position shown in FIGURE 5 is uppermost in the furnace, a reversing chamber 28 which extends opposite the right-hand free end of the longitudinal partition 22 transversely through the whole of the furnace shell and at its right-hand side is closed by means of an end wall 29, and of a second treatment chamber 30 defined by the opposite surface of the longitudinal partition 22 and the part of the furnace shell 16 opposing the said surface. By means of the reversing chamber 28 the chamber 30 is in connection with the first chamber 27, and at the side of the transverse partition 21 which faces away from the feed chamber 23 there is provided in the furnace shell 16 a materials discharge opening 31 through which the material after having passed through the chamber 30 is discharged onto a conveyor belt 32, as also seen in FIGURE 6. The discharge opening 31 may be barred by means of a slag removal grate.

As appears from FIGURE 6, the cross sections of the first chamber 27 and the second chamber 30 are substantially oval so that each chamber provides large surfaces on which the material can be spread for incineration.

In the end wall 29 there is provided an oil burner 33 which burns into the reversing chamber 28, and a smoke flue 34 which is also in connection with the reversing chamber 28 and coupled to an exhauster 35. The outlet pipe 36 from the exhauster 35 is in connection with a smoke uptake 37 as well as a return pipe 38 with an air intake 39, said return pipe leading into the feed hopper 25. In the passages 37, 38 and 39 there are disposed adjustable dampers 40 for regulating or discontinuing the flow of medium through said passages.

The arrangement shown in FIGURE 5 is particularly advantageous for use in cases when the material to be incinerated is comparatively dry and combustible. The combustion will take place in the chamber 5, the reversing chamber 28, and also partially in the chamber 27 which to varying degrees will also serve as a pre-drying chamber. The combustion air for the chamber 30 is drawn in through the discharge opening 31. Combustion air for the chamber 27 is drawn from the air intake 39 through the feed hopper 25, and by means of the return pipe 38 this air can be substituted wholly or partially by waste gas. The combustion air necessary in the reversing chamber 28 can be obtained from the chamber 30 as well as from the chamber 27. The smoke of the combustion from all chambers leaves the furnace through the smoke flue 34.

The arrangement shown schematically in FIGURE 7 is used preferably when moist material having a low calorific value is to be incinerated. The furnace itself with materials inlet and materials outlet is similar to the one shown in FIGURE 5, and like reference characters therefore designate like parts of the furnace.

The difference between the two arrangements is the one that in the end wall 29 there is only an oil burner 33. and that by means of the exhauster 35 the smoke uptake 37 is only connected to the feed hopper 25. Consequently, combustion air is drawn in through the discharge opening 31 and from there through the second chamber 30, the reversing chamber 28, the first chamber 27, the feed chamber 23, and the feed hopper 25 to the smoke uptake 37. By this means a particularly thorough pre-drying of the material is obtained.

Figure 8:
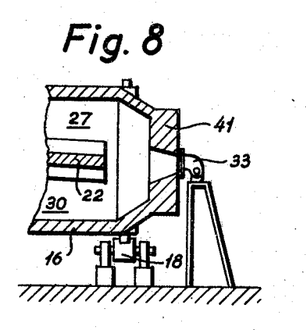
FIGURE 8 shows schematically a part of the rotary furnace having a built-in burner.
Figure 9:
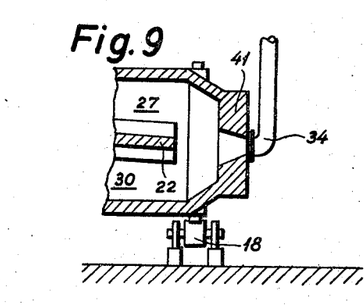
FIGURE 9 shows schematically a part of the rotary furnace with a built-in smoke flue.

FIGURES 8 and 9 show a somewhat modified embodiment of the furnace, seeing that in contradistinction to FIGURES 5 and 7 the end wall 29 is not a separate wall resting on a base, but at its right-hand end the furnace shell 16 is closed by means of an end wall 41 which is integral with the furnace shell 16 and thus participates in the rotary motion of the furnace. In order to obtain simple and low-cost tightening arrangements it is expedient in this case to place the oil burner 33 or the smoke flue 34 in the centre line of the furnace. Otherwise, in these examples it is presupposed that the embodiment shown in FIGURE 8 should be used in cases when the material to be treated has a high moisture content and oopr calorific value, for which reason a burner 33 will be expedient, whereas the embodiment shown in FIGURE 9 is intended to be used when the material is dry and easily combustible, so that additional heat from a burner can be dispensed with. In the embodiments shown in FIGURES 5, 7, 8 and 9 the longitudinal partition 22 extends somewhat obliquely in relation to the axis of the furnace in such a way that the distance between the partition 22 and the furnace shell 16 in the chamber 27 communicating with the materials inlet increases towards the reversing chamber 28. By means of this arrangement the passage of the material through the chambers 27 and 30 can be furthered without the necessity of inclining the whole furnace for purpose of materials passage, or to adopt a complex form of internal wall of the furnace shell.

When the furnace has been rotated from the position shown in FIGURE 5 or 7 so that the chamber 27 is in the lowermost position, material from the feed chamber 23 will move forward beneath the transverse partition 21 into the chamber 27. When the chamber 27 again moves upwardly during the continued rotation of the furnace, the material will gradually be transferred to the up-turned surface of the longitudinal partition 22, and on account of the inclined position thereof it will slide a short distance toward the reversing chamber 28, and so on.

Material having in this way passed through the chamber 27 will be transferred through the reversing chamber 28 to the second chamber 30, and in this chamber a similar effect of forward motion will apply during the rotation of the furnace, the opposite surface of the longitudinal partition 22 defining the chamber 30, having such an inclination that the distance between said surface and the part of the furnace shell defining the chamber increases from the reversing chamber 28 in the direction toward the discharge opening 31. During the rotation of the furnace the material will gradually pass through the chamber 30 toward the discharge opening 31, and the remaining material can be discharged through the said opening.

Figure 10:
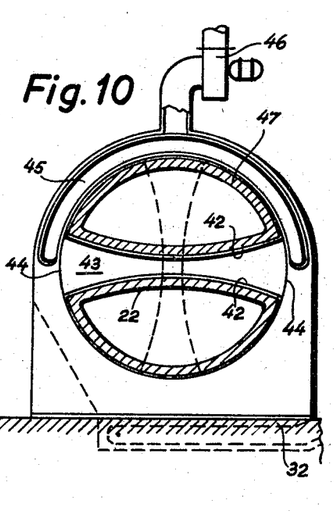
FIGURE 10 shows schematically a transverse section through an embodiment of the rotary furnace wherein the longitudinal partition is constructed of metal plates plus masonry, and wherein there is provided an arrangement for cooling the metal plates.
Figure 11:
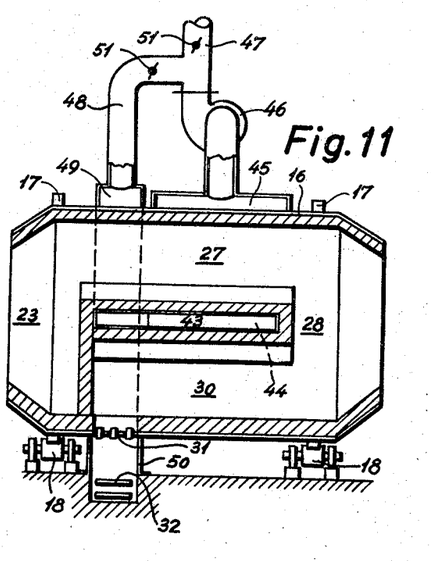
FIGURE 11 shows schematically a longitudinal section through a rotary furnace, the longitudinal partition of which is constructed as shown in FIGURE 10.

FIGURES 10 and 11 show an embodiment wherein the longitudinal partition 22 is constructed of two metal members 42 whose surfaces face one another, said members extending between opposite sides of the furnace shell 16 at a distance from one another so that a diametrical space 43 is formed between the members 42. Apertures 44 are provided in the furnace shell 16 opposite the greater part of this space. The longitudinal section of the shell wherein the apertures 44 are provided is partially surrounded by a suction hood 45 which is in connection with an exhauster 46.

By means of the said exhauster air can be drawn through the space 43 by way of the suction hood 45 and the apertures 44 to cool the partitions members 42, when the apertures 44 are passing the suction hood 45 during the rotation of the furnace. The outlet pipe from the exhauster 46 is in connection with a smoke uptake 47 and with a return pipe 48 which opens into a duct 49 surrounding the furnace shell 16 and communicating below with a slag removal duct 50 which is provided between the furnace shell 16 and the slag conveyor 32. In this way the duct 49 will lie opposite the path of rotation of the discharge opening 31. Regulating dampers 51 are provided in the smoke uptake 47 and in the return pipe 48.

By means of the said arrangement the hot exhaust air can be directed from the exhauster 46 over the discharge opening 31 into the combustion chamber 30 of the furnace. If necessary, barring members can be provided in the duct for the conveyor belt 32 in order to prevent the hot air from escaping to the atmosphere through this duct.

Figure 12:
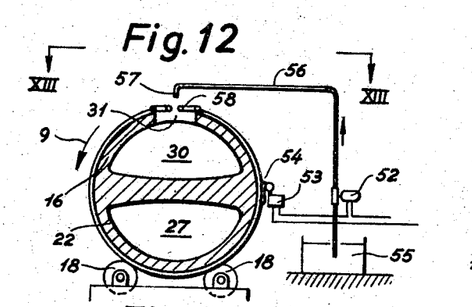
FIGURE 12 shows schematically a transverse section through an embodiment of the furnace with an arrangement for the supply of liquid fuel to the furnace.

FIGURE 12 shows a device for introducing liquid fuel into the furnace chamber 30. This device consists of a fuel pump 52 which is in connection with a control switch 53. The control switch cooperates with a control cam 54 provided on the furnace shell 16, every time the cam 54 passes the switch 53 during the rotation of the furnace. The suction side of the pump 52 is in connection with a source of fuel 55, and the delivery side of the pump is in connection with a delivery pipe 56 extending upwardly above the furnace and having a downwardly directed mouth 57. Said mouth is placed opposite the path of rotation of the discharge opening 31. The device is so arranged that the pump 52 can be started by means of the switch unit 53, 54 when the discharge opening 31 lies beneath the mouth 57 so that the liquid fuel flows from this mouth through the opening 31 into the chamber 30 of the furnace.

Figure 13:
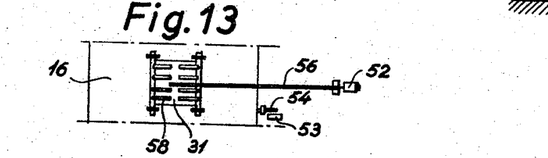
FIGURE 13 shows the same as seen from above along the line XIII—XIII in FIGURE 12.

In the shown embodiment the discharge opening 31 is barred by means of a slag removal grate 58, and the mouth 57 is then located opposite the interstice between two grate bars which extend in the direction of rotation, see FIGURE 13.

Figure 14:
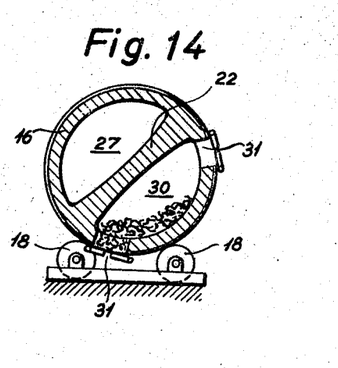
FIGURE 14 shows schematically a transverse section through a furnace with two discharge openings.

FIGURE 14 shows an embodiment with two discharge openings 31 which are spaced from each other peripherally of the furnace shell 16. The object of this arrangement is to avoid interruption of the supply of combustion air on account of an accumulation of combustion residue in front of a discharge opening during the rotation of the furnace.

The reference number 59 designates the refractory lining in the chambers 27 and 30, respectively.

Figure 15:
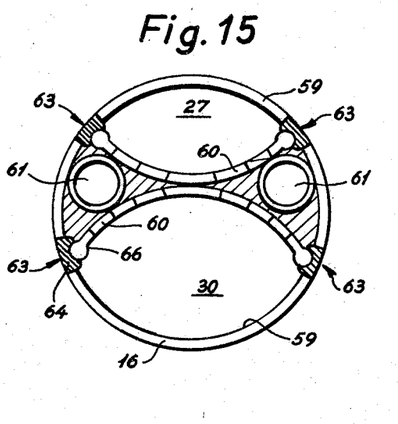
FIGURE 15 is a transverse section along the line XV–XV of FIGURE 16 through an another embodiment of the rotary furnace, wherein the longitudinal partition is constructed of two brick arches supporting one another.
Figure 16:
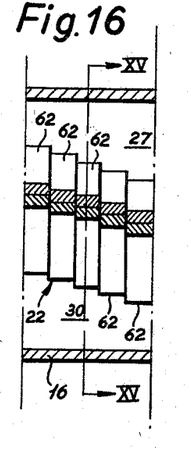
FIGURE 16 is a longitudinal section through a part of an incinerator, the longitudinal partition having been constructed as shown in FIGURE 15.

In the embodiment shown in FIGURES 15 and 16 the longitudinal partition 22 is constructed as two self-supporting arches 60 supporting one another at the middle, and between the outermost ends of which within the furnace shell 16 there are inserted hollow filling members 61. With a view to obtaining the inclination of the partition 22 shown in FIGURES 5, 7, 8 and 9, the arches 60 are composed as shown in FIGURE 16 of successive arch sections 62 stepped in the longitudinal direction of the furnace.

Figures 17, 18:
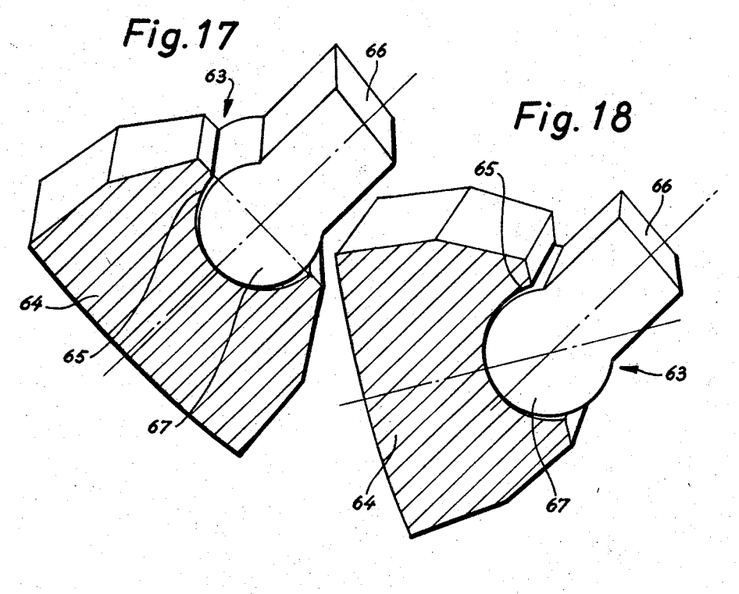
FIGURE 17 shows to an enlarged scale a transverse section through a pair of moulded bricks constituting part of the longitudinal partition shown in FIGURES 15 and 16.
FIGURE 18 shows the same pair of moulded bricks with the bricks in a somewhat different position.

Pairs of moulded bricks 63 have been used for the construction of the arches, details of said bricks being shown in FIGURES 17 and 18. Each pair of moulded bricks consists of a support brick 64 with an outwardly open bearing groove 65, the transverse section of which is an arc of a circle, and of a counter brick 66 which is designed with a correspondingly cylindrical end 67 for rotatable mounting in the groove. A comparison between FIGURE 17 and FIGURE 18 shows that the same pair of moulded bricks can be used for the construction of different arch formations.

Having thus fully described my invention I claim as new and desire to secure by Letters Patent:

1. A rotary furnace for incinerating house refuse, industrial refuse and/or other waste materials, comprising a furnace shell, means for mounting said shell for rotation about a substantially horizontal axis, at least one transverse partition extending within the said shell from one wall to an opposite wall thereof and in the longitudinal direction thereof thus dividing at least a portion of the space within the shell into at least two chambers, a passageway between said chambers at one end of the shell for communication between the chambers at said end, means for feeding the said materials into one of said chambers at a location substantially spaced from said passageway, and discharge means communicating with the other chamber at a location substantially spaced from said passageway.

2. A rotary furnace for incinerating house refuse, industrial refuse and/or other waste materials, comprising a furnace shell, means for mounting said shell for rotation about a substantially horizontal axis, means for feeding the said materials into the enclosure defined by said shell, means for discharging treated material from said enclosure, and at least one partition extending within the said enclosure in the longitudinal direction thereof thus dividing at least a portion of the enclosure into at least two chambers, the said partition extending substantially diametrically of the enclosure from proximity to the one end of the enclosure to the other end of the enclosure, a reversing chamber connecting the said two chambers, said reversing chamber being formed at said one end of the enclosure, the said means for feeding the said materials into the enclosure communicating with one of said chambers, and the said discharge means communicating with the other chamber.

3. A rotary furnace for incinerating house refuse, industrial refuse and/or other waste materials, comprising a furnace shell defining an enclosure, means for mounting said shell for rotation about a substantially horizontal axis, at least one partition extending within said enclosure in the longitudinal direction thereof from proximity at one of its ends to one end of the enclosure towards the other end of the enclosure thus dividing a portion of the enclosure into at least two longitudinal chambers, a further partition within the enclosure extending in transverse direction from the first mentioned end of the first partition to the furnace shell thus forming an end wall for one of said longitudinal chambers, the said further partition with the portion of the enclosure remote from the longitudinal chambers further forming a feeding chamber communicating with the second of said longitudinal chambers beyond the center end of the transverse partition, a passageway between said longitudinal chambers at one end of the enclosure for communication between the chambers at said end, means for feeding the said materials communicating with the said feeding chamber, and discharge means for discharging treated material communicating with the other chamber.

4. A rotary furnace for incinating house refuse, industrial refuse and/or other waste materials, comprising a furnace shell defining an enclosure, means for mounting said shell for rotation about a substantially horizontal axis, at least one partition extending within said enclosure in the longitudinal direction thereof from proximity to one end of the enclosure towards the other end thereof thus dividing a portion of the enclosure into at least two longitudinal chambers, a further partition within the enclosure extending in transverse direction from the first mentioned end of the first partition to the furnace shell thus forming an end wall for one of said longitudinal chambers, the said further partition together with the portion of the enclosure remote from the longitudinal chambers further forming a feeding chamber communicating with the second of said longitudinal chambers beyond the center end of the transverse partition, a passageway between said longitudinal chambers at the end of the enclosure remote from the enclosure end defining the feeding chamber for communication between the chambers at said end, means for feeding the said materials communicating with the said feeding chamber, and at least one discharge opening in the portion of the furnace shell defining the first mentioned chamber, this opening being defined in the shell at the side of the transverse partition remote from the said feed chamber.

5. A rotary furnase for incinerating house refuse, industrial refuse and/or other waste materials, comprising a furnace shell defining an enclosure, means for mounting said shell for rotation about a substantially horizontal axis, means for feeding the said materials into the enclosure defined by said shell, discharge means for discharging treated material from said enclosure, and at least one transverse partition extending within the said shell from one wall to an opposite wall thereof and in the longitudinal direction thereof thus divding at least a portion of the enclosure into at least two chambers, a passageway between said chambers at one end of the enclosure for communication between said chambers at said end, a burner being provided in said passageway, the said means for feeding the said materials into the enclosure communicating with one of said chambers, and the said discharge means communicating with the other chamber.

6. A rotary furnace for incinerating house refuse, industrial refuse and/or other waste materials comprising a furnace shell, means for mounting said shell for rotation about a substantially horizontal axis, means for feeding the said materials into the enclosure defined by said shell, means for discharging treated material from said enclosure, and at least one transverse partition extending within said enclosure in the longitudinal direction thereof thus dividing at least a portion of the enclosure into at least two chambers, the said partition extending substantially diametrically of the shell from proximity to the one end of the enclosure to the other end of the enclosure, a reversing chamber connecting the said two chambers, formed at said one end of the enclosure, an oil burner being provided in the reversing chamber, the said means for feeding the said materials into the enclosure communicating with one of said chambers, and the said discharge means communicating with the other chamber.

7. A rotary furnace for incinerating house refuse, industrial refuse and/or other waste materials, comprising a furnace shell, means for mounting said shell for rotation about a substantially horizontal axis, means for feeding the said materials into the enclosure defined by said shell, discharge means for discharging treated material from said enclosure, at least one partition extending within said enclosure in the longitudinal direction thereof thus dividing at least a portion of the enclosure into at least two chambers, a passageway between said chambers at one end of the enclosure for communication between the chambers at said end, the said means for feeding the said materials into the enclosure communicating with one of said chambers, the said discharge means communicating with the other chamber, and means mounted for the introduction of liquid fuel into the said other chamber through said discharge means.

8. A rotary furnace for incinerating house refuse, industrial refuse and/or other waste materials, comprising a furnace shell, means for mounting said shell for rotation about a substantially horizontal axis, means for feeding the said materials into the enclosure defined by said shell, discharge means for discharging treated material from said enclosure, at least one partition extending within said enclosure in the longitudinal direction thereof thus dividing at least a portion of the enclosure into at least two chambers, a passageway between said chambers at one end of the enclosure for communication between the chambers at said end, the said means for feeding the said materials into the enclosure communicating with one of said chambers, the said discharge means communicating with the other chamber and comprising at least one aperture in the portion of the furnace shell defining said chamber, and fuel supply means provided outside the furnace shell and comprising at least one supply passageway mounted for termination opposite the path of rotation of the said discharge means, the said fuel supply means being further provided with control means for activating the said supply means, said control means being adapted for operation in dependence of the rotary motion of the furnace shell for the supply of fuel into the said aperture when the aperture lies opposite the discharge end of the supply passageway.

9. A rotary furnace for incinerating house refuse, industrial refuse and/or other waste materials, comprising a furnace shell, means for mounting said shell for rotation about a substantially horizontal axis, means for feeding the said materials into the enclosure defined by said shell, discharge means for discharging treated material from said enclosure, and at least one transverse partition extending within the said shell from one wall to an opposite wall thereof and in the longitudinal direction thereof thus dividing at least a portion of the enclosure into at least two chambers, a passageway between said chambers at one end of the enclosure for communication between said chambers at said end, a smoke flue of the said furnace being mounted for communication with said passageway, the said means for feeding the said materials into the enclosure communicating with one of said chambers, and the said discharge means communicating with the other chamber.

10. A rotary furnace for incinerating house refuse, industrial refuse and/or other waste materials, comprising a furnace shell defining an enclosure, means for mounting said shell for rotation about a substantially horizontal axis, at least one partition extending within said enclosure in the longitudinal direction thereof from proximity to the one end of the enclosure towards the other end thereof thus dividing a portion of the enclosure into at least two longitudinal chambers, a further partition within the enclosure, extending in transverse direction from the first mentioned end of the first partition to the furnace shell thus forming an end wall for one of said longitudinal chambers, the said further partition with the portion of the enclosure remote from the longitudinal chambers further forming a feeding chamber communicating with the second of said longitudinal chambers beyond the center end of the transverse partition, a passageway between said longitudinal chambers at one end of the enclosure for communication between the chambers at said end, a smoke flue of the said furnace being mounted for communication with the said feeding chamber, and means for feeding the said materials communicating with the feeding chamber, and discharge means for discharging treated material communicating with the other chamber.

11. A rotary furnace in incinerating house refuse, industrial refuse and/or other waste materials, comprising a furnace shell, means for mounting said shell for rotation about a substantially horizontal axis, means for feeding the said materials into the enclosure defined by said shell, discharge means for discharging treated materials from said enclosure, and at least one partition extending within the said enclosure in the longitudinal direction thereof thus dividing at least a portion of the enclosure into at least two chambers, a passageway between said chambers at one end of the enclosure for communication between the chambers at said end, the said means for feeding the said materials into the enclosure communicating with one of said chambers, the said discharge means communicating with the other chamber, and the partition forming substantially an acute angle with the longitudinal axis of the enclosure in such a way that the transverse sectional area of the chamber connected with the feeding means increases from the feeding point towards the passageway between the two chambers, and that the transverse sectional area of the chamber connected with the discharge means increases from the said passageway towards the point of discharge.

12. A rotary furnace for incinerating house refuse, industrial refuse and/or other waste materials, comprising a furnace shell, means for mounting said shell for rotation about a substantially horizontal axis, means for feeding the said materials into the enclosure defined by said shell, discharge means for discharging treated material from said enclosure, and at least one partition extending within the said enclosure in the longitudinal direction thereof thus dividing at least a portion of the enclosure into at least two chambers, the said partition being defined by two sheet metal members mounted so as to face each other and to extend transversely between opposite side portions of the furnace shell and spaced apart from one another, a passageway between said chambers at one end of the enclosure for communication between the chambers at said end, the said means for feeding the said materials into the enclosure communicating with one of said chambers, and the said discharge means communicating with the other chamber.

13. A rotary furnace for incinerating house refuse, industrial refuse and/or other waste materials, comprising a furnace shell, means for mounting said shell for rotation about a substantially horizontal axis, means for feeding the said materials into the enclosure defined by said shell, discharge means for discharging treated material from said enclosure, and at least one partition extending within the enclosure in the longitudinal direction thereof thus dividing at least a portion of the enclosure into at least two chambers, the said partition being defined by two metal sheet members mounted so as to face each other and to extend transversely between opposite side portions of the furnace shell and spaced apart from one another, at least one aperture in the portion of the furnace shell opposite the space between said members, a suction hood for gaseous medium connected with a suction source and extending circumferentially around at least a portion of the circumference of the furnace shell opposite the path of rotation of the said aperture, a passageway between said chambers at one end of the enclosure for communication between the chambers at said end, the said means for feeding the said materials into the enclosure communicating with one of said chambers, and the discharge means communicating with the other chamber.

14. A rotary furnace for incinerating house refuse, industrial refuse and/or other waste materials, comprising a furnace shell, means for mounting said shell for rotation about a substantially horizontal axis, means for feeding the said material into the enclosure defined by said shell, discharge means for discharging treated material from said enclosure, and at least one partition extending within the enclosure in the longitudinal direction thereof thus dividing at least a portion of the enclosure into at least two chambers, the said partition being defined by two metal sheet members mounted so as to face each other and to extend transversely between opposite side portions of the furnace shell and spaced apart from one another, at least one aperture in the portion of the furnace shell opposite the space between said members, a suction hood for gaseous medium, connected with a suction source and extending circumferentially around at least a portion of the circumference of the furnace shell opposite the path of rotation of the said aperture, the gaseous medium discharge from the said hood being mounted for communication with a combustion air inlet to the furnace, a passageway between said chambers at one end of the enclosure for communication between the chambers at said end, the said means for feeding the said materials into the enclosure communicating with one of said chambers, and the discharge means communicating with the other chamber.

15. A rotary furnace for incinerating house refuse, industrial refuse and/or other waste materials, comprising a furnace shell, means for mounting said shell for rotation about a substantially horizontal axis, means for feeding the said materials into the enclosure defined by said shell, discharge means for discharging treated material from said enclosure, and at least one partition extending within the said enclosure in the longitudinal direction thereof thus dividing at least a portion of the enclosure into at least two chambers, the said partition being constructed as two self-supporting brick arches supporting one another at the middle, a passageway between said chambers at one end of the enclosure for communication between the chambers at the said end, the said means for feeding the said materials into the enclosure communicating with one of said chambers, and the said discharge means communicating with the other chamber.

16. A rotary furnace for incinerating house refuse, industrial refuse and/or other waste materials, comprising a furnace shell, means for mounting said shell for rotation about a substantially horizontal axis, means for feeding the said materials into the enclosure defined by said shell, discharge means for discharging treated material from said enclosure, and at least one partition extending within the said enclosure in the longitudinal direction thereof thus dividing at least a portion of the enclosure into at least two chambers, the said partition being constructed as two self-supporting brick arches supporting one another at the middle, hollow filling members inserted in the space defined by the arches and corresponding portions of the furnace shell, a passageway between said chambers at one end of the enclosure for communication between the chambers at the said end, the said means for feeding the said materials into the enclosure communicating with one of said chambers, and the said discharge means communicating with the other chamber.

17. A rotary furnace for incinerating house refuse, industrial refuse and/or other waste material, comprising a furnace shell, means for mounting said shell for rotation about a substantially horizontal axis, means for feeding the said materials into the enclosure defined by said shell, discharge means for discharging treated material from said enclosure, and at least one partition extending within the said enclosure in the longitudinal direction thereof thus dividing at least a portion of the enclosure into at least two chambers, the said partition being composed of a number of successive self-supporting brick arch sections supporting each other in pairs at the middle, the sections being stepped in the longitudinal direction of the enclosure, a passageway between the said chambers at one end of the enclosure for communication between the chambers at the said end, the said means for feeding the said materials into the enclosure communicating with the one of the two chambers where the distance between the partition and the opposite portion of the furnace shell is smaller than at the passageway end of the enclosure, the said discharge means communicating with the other chamber.

18. A rotary furnace for incinerating house refuse, industrial refuse and/or other waste materials, comprising a furnace shell, means for mounting said shell for rotation about a substantially horizontal axis, means for feeding the said materials into the enclosure defined by said shell, discharge means for discharging treated material from said enclosure, and at least one partition extending within the said enclosure in the longitudinal direction thereof thus dividing at least a portion of the enclosure into at least two chambers, the said partition being constructed as two self-supporting brick arches supporting one another at the middle, a pair of moulded bricks for use at the edges of the said arches, the said pair consisting of a support brick to be mounted at the furnace shell, the support brick having an outwardly open bearing groove in the brick surface opposite the surface meant to face the furnace shell, the transverse section of the said groove being an arc of a circle, and of a counter brick having a corresponding cylindrical end for mounting in the groove of the first mentioned brick, the second brick being meant for use as a bottom brick of a brick arch, a passageway between said chambers at one end of the enclosure for communication between the chambers at the said end, the said means for feeding the said materials into the enclosure communicating with one of said chambers, and the said discharge means communicating with the other chamber.

19. A rotary furnace as claimed in claim 1, wherein the surfaces of the partition facing the inner surfaces of the shell are of concave configuration.

20. A rotary furnace as claimed in claim 1, wherein the said means for feeding the said materials into the enclosure communicates with said one chamber and the said discharge means communicates with the said other chamber at the end of the enclosure which is opposite that at which the passageway is located.

21. A rotary furnace as claimed in claim 1, comprising at least two discharge openings in the portion of the furnace shell defining the second chamber, the said discharge openings being mutually spaced in the circumferential direction of the furnace shell.

References Cited
UNITED STATES PATENTS

| | | | |
|---|---|---|---|
| 804,076 | 11/1905 | Warren | 263—33 |
| 864,816 | 9/1907 | Warren | 263—33 |
| 1,404,381 | 1/1922 | Fasting | 263—33 |
| 1,830,002 | 11/1931 | Schifferle | 263—33 |
| 2,788,204 | 4/1957 | Kalling et al. | 263—33 |

JAMES W. WESTHAVER, *Primary Examiner.*